(12) United States Patent
Becker et al.

(10) Patent No.: US 9,163,536 B2
(45) Date of Patent: Oct. 20, 2015

(54) WIND TURBINE WITH AN AUTOMATIC LIQUID LUBRICANT CHANGING ARRANGEMENT

(75) Inventors: Christian Becker, Aachen (DE); Michaela Brasseur, Aachen (DE); Helmut Kölpin, Baesweiler (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 820 days.

(21) Appl. No.: 13/411,668

(22) Filed: Mar. 5, 2012

(65) Prior Publication Data

US 2012/0243998 A1   Sep. 27, 2012

(30) Foreign Application Priority Data

Mar. 21, 2011   (EP) .................................. 11158994

(51) Int. Cl.
*F01M 11/04* (2006.01)
*F03D 11/00* (2006.01)
*F16N 31/00* (2006.01)
*F16N 39/00* (2006.01)
*F01M 11/10* (2006.01)
*F16N 39/06* (2006.01)
*F01M 11/02* (2006.01)

(52) U.S. Cl.
CPC ............ *F01M 11/0458* (2013.01); *F01M 11/10* (2013.01); *F03D 11/0008* (2013.01); *F16N 31/00* (2013.01); *F16N 39/06* (2013.01); *F01M 11/02* (2013.01); *F01M 2011/14* (2013.01); *F05B 2260/98* (2013.01); *F16N 2200/00* (2013.01); *F16N 2250/00* (2013.01); *Y02E 10/722* (2013.01); *Y02E 10/726* (2013.01)

(58) Field of Classification Search
CPC ............. F01M 2001/1014; F01M 9/02; F03D 11/0008; F03D 11/005; F03D 11/0075; F03D 7/0248
See application file for complete search history.

(56) References Cited

U.S. PATENT DOCUMENTS

| 4,168,439 | A | * | 9/1979 | Palma .............................. 290/44 |
| 5,067,455 | A | * | 11/1991 | Okajima et al. .......... 123/196 R |
| 6,265,785 | B1 | * | 7/2001 | Cousineau et al. ............. 290/44 |
| 7,802,469 | B2 | * | 9/2010 | Staedler et al. ............ 73/170.01 |

(Continued)

FOREIGN PATENT DOCUMENTS

| CN | 101228351 A | 7/2008 |
| CN | 101326363 A | 12/2008 |

(Continued)

OTHER PUBLICATIONS

European Search Report for EP11158994 dated Oct. 25, 2011.

*Primary Examiner* — Edward Look
*Assistant Examiner* — Brian O Peters (57) ABSTRACT

A wind turbine includes a component arranged in the nacelle of the wind turbine, which component requires lubricating with a liquid lubricant. An automatic liquid lubricant changing arrangement includes a source of fresh liquid lubricant, a supply line for supplying fresh liquid lubricant from the source to the component, a waste liquid lubricant collecting unit for waste liquid lubricant, and a removal line for conveying waste liquid lubricant from the component to the waste liquid lubricant collecting unit. Moreover, a control device for such a wind turbine and a method of operating such a wind turbine are provided.

16 Claims, 3 Drawing Sheets

(56) References Cited

U.S. PATENT DOCUMENTS

| | | | |
|---|---|---|---|
| 7,832,980 B2 * | 11/2010 | Demtroder et al. | 415/118 |
| 2007/0104577 A1 | 5/2007 | Hansen et al. | |
| 2009/0081026 A1 | 3/2009 | Demtroder et al. | |
| 2009/0206603 A1 | 8/2009 | Gonzalez | |
| 2010/0056315 A1 * | 3/2010 | Scholte-Wassink | 475/159 |
| 2011/0168495 A1 * | 7/2011 | Subramaniam et al. | 184/6.12 |

FOREIGN PATENT DOCUMENTS

| | | | | |
|---|---|---|---|---|
| CN | 101341333 A | 1/2009 | | |
| EP | 0684368 A1 | 11/1995 | | |
| EP | 0928883 A1 | 7/1999 | | |
| EP | 1686244 A2 | 8/2006 | | |
| ES | 2321995 A1 | 6/2009 | | |
| WO | 2009147147 A2 | 12/2009 | | |
| WO | WO 2010006389 | * | 1/2010 | F03D 9/00 |

* cited by examiner

WIND TURBINE WITH AN AUTOMATIC LIQUID LUBRICANT CHANGING ARRANGEMENT

CROSS REFERENCE TO RELATED APPLICATIONS

This application claims priority of European Patent Office Application No. 11158994.1 EP filed Mar. 21, 2011. All of the applications are incorporated by reference herein in their entirety.

FIELD OF INVENTION

The claimed invention describes a wind turbine comprising a component arranged in a nacelle of the wind turbine, which component requires lubricating with a liquid lubricant.

BACKGROUND OF INVENTION

Components of a wind turbine like a generator or a gear require lubrication with a lubricant, for example a liquid lubricant such as oil, to reduce friction in a bearing of such components. The liquid lubricant will degenerate with increasing time in use, which means that the friction is not reduced in a sufficient manner. The degeneration of the liquid lubricant is caused by particles as a result of abrasion, high pressure and temperature or chemical impacts. Eventually, the liquid lubricant will totally loose its lubricating abilities.

Therefore, it is common to exchange the liquid lubricant in fixed intervals, e.g. every five years. This is done manually by technicians who have to arrive at the wind turbine and to enter the nacelle of the wind turbine. Depending on the position of the wind turbine, such manual oil changing may have high cost implications.

SUMMARY OF INVENTION

It is an object of the invention to provide a wind turbine with reduced efforts of maintenance.

The object is achieved by a wind turbine, by a control device and a method of operating a wind turbine as claimed in the claims.

The wind turbine comprises a component arranged in a nacelle of the wind turbine, which component requires lubricating with a liquid lubricant, and an automatic liquid lubricant changing arrangement with
- a source of fresh liquid lubricant, such as oil, for example,
- a supply line for supplying fresh liquid lubricant from the source to the component,
- a waste liquid lubricant collecting unit for waste liquid lubricant, and
- a removal line for conveying waste liquid lubricant from the component to the waste liquid lubricant collecting unit.

The component arranged in the nacelle of the wind turbine could, for example, be a generator for transforming mechanical energy into electrical energy or a gear for transforming the number of revolution of a hub with blades to another number of revolution, for example the number of revolution of a generator shaft. Further, the component could also be a motor or gear for turning the nacelle with respect to the tower to bring the hub with the blades in line with the direction of wind or a bearing of a shaft of the wind turbine, for example the main shaft, which is connected to the hub, or a generator shaft.

The component may comprise a lubricating device for lubricating the component during operation. Such a lubricating device may comprise a closed-loop arrangement with an inlet opening and an outlet opening connected with the component in which the liquid lubricant circulates in use. Such a lubricating device may comprise a filter to keep back dirt particles in the liquid lubricant and a pump for generating a circulation of the liquid lubricant to provide sufficient lubrication of the component.

The automatic liquid lubricant changing arrangement has a supply line for supplying fresh liquid lubricant from the source of fresh liquid lubricant to the component or lubricating device of the component and a removal line for conveying waste liquid lubricant from the component or lubricating device of the component to the waste liquid lubricant collecting unit. By opening the removal line waste liquid lubricant, e.g. degenerated liquid lubricant, can be removed from the component, e.g. the lubricating device. After closing the opened removal line and opening the supply line fresh liquid lubricant can be supplied to the component. For opening and closing the supply line and removal line valves with appropriate actuators, e.g. electromagnetic actuators, may be provided. Using such an automatic liquid lubricant chancing arrangement a liquid lubricant exchange can be executed without the need of a technician being in the nacelle. This reduces the maintenance effort and costs.

In a preferred embodiment the automatic liquid lubricant changing arrangement comprises a control device. Such a control device for a wind turbine comprises an output interface for
- stopping the wind turbine by activating a brake of the wind turbine,
- removing waste liquid lubricant from the component by opening the removal line,
- supplying fresh liquid lubricant to the component by opening the supply line, and
- starting the wind turbine by releasing the brake.

The control device may comprise a clock for determining a point of time for starting the process of liquid lubricant exchange. Accordingly, the control device may work in a stand-alone manner without receiving control signals from outside, for example from a helm stand.

Additionally or alternatively, the control device may comprise an input interface for receiving a start signal for starting the process of liquid lubricant exchange. This allows exchanging the liquid lubricant by use of a remote control. A technician can start changing the lubricant at a helm stand far away from the wind turbine. Further, the control device may be connected to a sensor device by the use of the input interface. The sensor device can measure the amount/quantity and/or quality of the liquid lubricant, e.g. the degree of degeneration. According to the values measured with the sensor device the control device can then start the procedure to exchange liquid lubricant.

When liquid lubricant should be removed and fresh liquid lubricant should be refilled, the control device generates and sends a control signal to stop the wind turbine, e.g. the hub of the wind turbine, by activating a brake of the wind turbine. Accordingly, the output interface of the control device is preferably adapted to transmit such a control signal to the brake.

Further, the control device may generate and send a control signal to open the removal line, e.g. to open a valve of the removal line. This control signal may also be transmitted via an output interface of the control device.

After the control device has generated and sent a signal to close the removal line, the control device may generate and send a control signal to open the supply line, e.g. to open a valve of the supply line. This control signal may also be transmitted via an output interface of the control device.

Finally, the control device may generate and send, via an output interface, a signal to release the brake. This control signal is also transmitted with the use of the control device.

A method of operating a wind turbine with an automatic liquid lubricant changing arrangement comprises the following steps:

stopping the wind turbine using a brake of the wind turbine,
removing waste liquid lubricant from the component by opening a removal line for conveying waste liquid lubricant from the component to a waste liquid lubricant collecting unit for waste liquid lubricant of the automatic liquid lubricant changing arrangement,
supplying fresh liquid lubricant to the component by opening a supply line for supplying fresh liquid lubricant from a source of fresh liquid lubricant of the automatic liquid lubricant changing arrangement to the component, and
starting the wind turbine by releasing the brake.

Particularly advantageous embodiments and features of the invention are defined in the dependent claims, as revealed hereinafter, and the subsequent description. Features of the various embodiments described may be combined as appropriate.

In a preferred embodiment, the waste liquid lubricant collecting unit comprises a collecting tank for waste liquid lubricant. Waste liquid lubricant is stored in the collecting tank up to the next scheduled maintenance procedure. During this maintenance procedure the collecting tank can then be emptied by a technician. Accordingly, there is no need to retrieve the waste liquid lubricant from the wind turbine instantly after a lubricant exchange. Therefore, a time scheduling for maintenance efforts is more flexible.

The waste liquid lubricant collecting unit, for example comprising such a collecting tank, and the source for fresh liquid lubricant, e.g. a tank, can be arranged in the nacelle of the wind turbine. In a preferred embodiment the waste liquid lubricant collecting unit, e.g. the collecting tank, and/or the source, e.g. also a tank, are arranged at a base part of a tower of the wind turbine. Accordingly, the supply line and/or the removal line preferably extend through the tower of the wind turbine from the nacelle, in which the component to lubricate is situated, to the base of the tower. Accordingly, a transport of fresh liquid lubricant to the nacelle or transport of waste liquid lubricant from the top to the base of the tower by maintenance personal, optionally using an elevator, is not necessary. Preferably, the tank can be an exchangeable container. Such an exchangeable container may serve as tank of the source, for example. The exchangeable container may be detached from the supply line after the exchangeable container is emptied, e.g. does not contain enough fresh liquid lubricant anymore. After detaching such an empty container a new exchangeable container with fresh liquid lubricant can be connected to the supply line. Further, a second exchangeable container can serve as collecting tank. If such an exchangeable container is filled up with waste liquid lubricant the exchangeable container can be detached from the removal line and replaced by an empty exchangeable container during maintenance efforts. The exchangeable container filled up with liquid waste lubricant is then taken away from the technician carrying out maintenance efforts. The use of such exchangeable containers as tanks and/or collecting tanks reduces the maintenance efforts since no pumping has to be carried out during the maintenance efforts.

To allow a yawing of the nacelle relative to the tower, the electric connections from components in the nacelle to the tower is often realized via cables having a suitable length such that the nacelle may rotate, driven by motor or by the incoming wind, several times around the yawing axis. In an initial position of the nacelle the cables exhibit a sag and the cable twists further with each turn of the nacelle until the cable is too short to allow a further turn. Then, the nacelle is returned to the initial position using a motor driven by an appropriate controlling unit. Accordingly, the supply line and/or the removal line may preferably comprise a flexible hose with a sag, wherein the length of the sag is dimensioned in accordance to a length of an electric cable running from the tower into the nacelle. In this way, the twisting and untwisting of the flexible hose can advantageously be synchronized with a twisting and untwisting of the electric cable.

The fresh liquid lubricant can be conveyed to the component in the nacelle at the top of the tower of the wind turbine by applying pressure to the fresh liquid lubricant, for example by the use of pressurised air. In a preferred embodiment the automatic liquid lubricant changing arrangement comprises a pump for conveying fresh liquid lubricant, for example from a container at the base of the tower to the component or lubricating device of the component, which is situated in the nacelle of the wind turbine. The pump is driven by a motor, for example an electric motor, which could be controlled electronically for maintaining a desired amount of liquid lubricant. If the pump works with a constant pumping rate, the amount of liquid lubricant may be controlled by simply controlling the operating time of the pump. Further, this pump or a separate second pump could preferably be used to support the draining of waste liquid lubricant from the component or lubrication device of the component and/or accelerating the flow of the waste liquid lubricant from the nacelle to the base of the tower of the wind turbine caused by gravity. This reduces the time for the lubricant exchange and, therefore, increases the working time of the wind turbine, especially if the waste liquid lubricant is semi-liquid, due to degeneration.

The source, e.g. tank, of fresh liquid lubricant could have the same volume for storing fresh liquid lubricant as the collecting tank for storing waste liquid lubricant. On the other hand, the collecting tank for storing waste liquid lubricant could have a greater volume than the source tank for fresh liquid lubricant. This allows storing waste liquid lubricant of multiple lubricant exchanges. In a preferred embodiment the source, e.g. tank, has a greater volume for storing fresh liquid lubricant than the waste lubricant collecting tank so that an additional volume, with respect to the volume of the waste lubricant collecting tank, of fresh liquid lubricant could be stored in the source tank. This additional volume may fill the supply line during a lubricant exchange, because the supply line is a dead volume when conveying liquid lubricant from the base of the tower to the nacelle which has to be filled before the level of liquid lubricant reaches the component. At the end of a lubricant changing process the lubricant in this additional or dead volume can flow back from the supply line into the source tank of fresh liquid lubricant.

The cross-section area of the supply line may be equal to the cross-section area of the removal line. In a preferred embodiment, the cross-section area of the removal line may be greater than cross-section area of the supply line. This reduces the flow resistance of the removal line in respect to the supply line. Accordingly, the gravity-induced flow of waste liquid lubricant, which is more viscous than the fresh liquid lubricant due to degeneration, may be faster than via a line with a smaller cross-section area. Further, in a supply line with a smaller cross-section area the dead volume of the supply line and, therefore, an additional amount of fresh liquid lubricant stored in the source tank to fill the supply line may be less. Accordingly, the size of the source tank and the time for filling the supply line can be reduced.

In a preferred embodiment the automatic liquid lubricant changing arrangement comprises a reconditioning device for reconditioning at least a part of the waste liquid lubricant. Therefore, no waste or less waste liquid lubricant has to be removed from the wind turbine. Accordingly, for example, the size of the collecting tank of the waste collecting unit can be reduced or no such collecting tank is necessary at all. Further, the size of a source tank of fresh liquid lubricant may be reduced or such a tank is not necessary anymore because the reconditioning device may be the source or a part of the source of fresh liquid lubricant.

The reconditioning device may have an input opening which may be connected to a first end of a first connecting line. The second end of the first connecting line may be connected to the removal line and/or to an output opening of the waste liquid lubricant collecting unit. An output opening of the reconditioning device may be connected to a first end of a second connecting line, and the second end of the second connecting line may be connected to the supply line and/or to a source tank of fresh liquid lubricant.

The reconditioning device preferably comprises a filter to refine particles which degenerate the quality of liquid lubricant. In a particularly preferred embodiment, the reconditioning device comprises a reservoir with an additive to reconditioning waste liquid lubricant. Such an additive transforms waste liquid lubricant with degenerated quality to reconditioned fresh liquid lubricant with an improved quality.

The reconditioning device can be arranged in the nacelle of the wind turbine. Accordingly, the supply line and/or removal line need not extend from the base of the tower into the nacelle. In a preferred embodiment the reconditioning device is arranged in the base of the tower of the wind turbine. Hence, no space is needed in the nacelle to accommodate the reconditioning device.

Other objects and features of the invention will become apparent from the following detailed description considered in conjunction with the accompanying drawings. It is to be understood, however, that the drawings are designed solely for the purposes of illustration and not as a definition of limitations of the invention.

BRIEF DESCRIPTION OF THE DRAWINGS

In the drawings, like reference numbers refer to like objects throughout. Objects in the drawings are not necessarily drawn to scale.

DETAILED DESCRIPTION OF INVENTION

Figure 1:
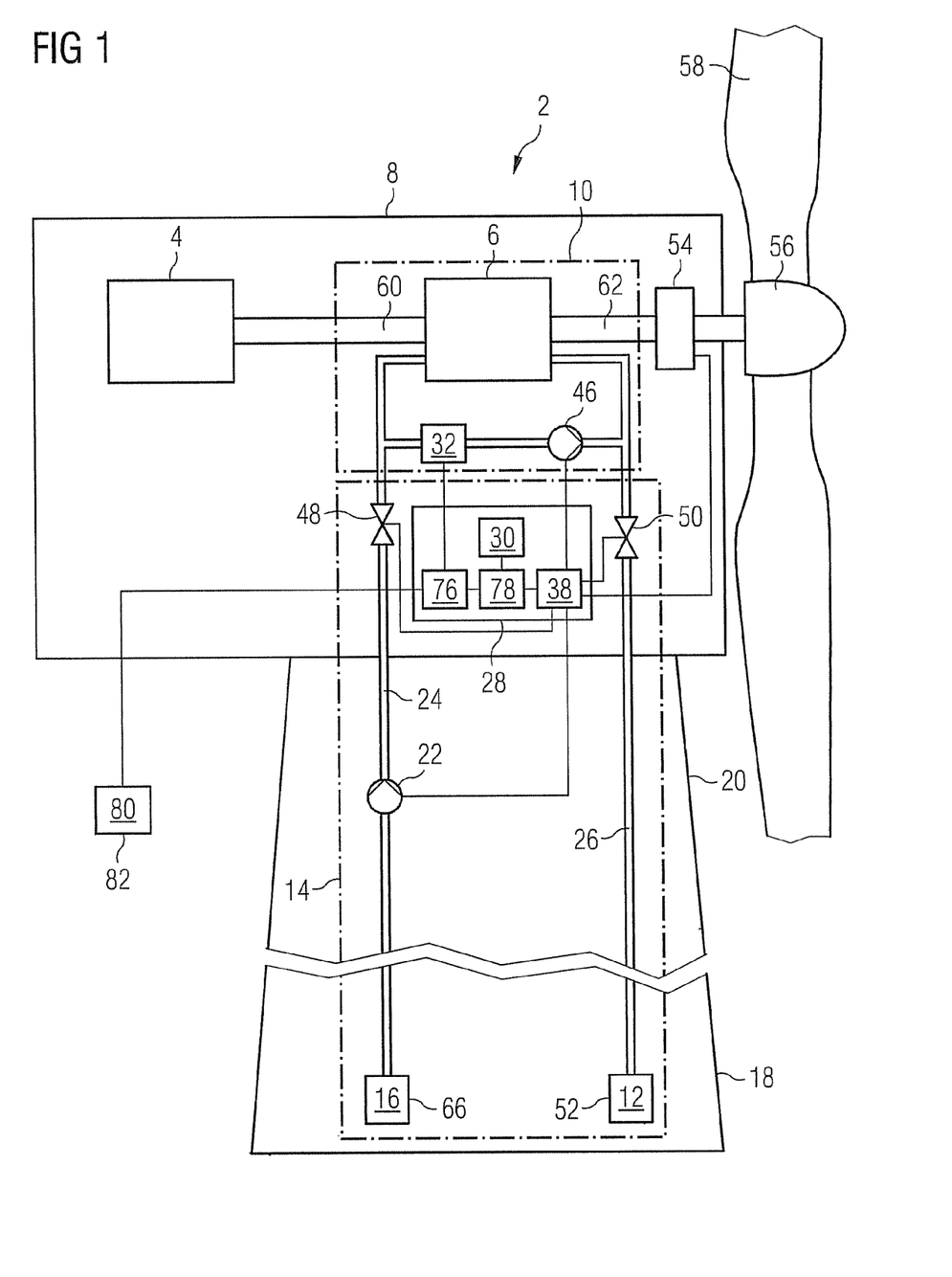
FIG. 1 shows a schematic representation of a first embodiment of a wind turbine.

FIG. 1 shows an embodiment of a wind turbine 2. The wind turbine 2 comprises a tower 18, a nacelle 8 being rotatably supported by the tower 18, and a hub 56 being rotatably supported by the nacelle 8. Blades 58 are arranged on and fixed to the hub 4. The hub 54 is coupled to a main shaft 62 which is coupled to a gear 6.

The gear 6 is coupled to a generator 4 by a generator shaft 60. The gear 6 transforms the relative low number of revolutions of the hub 56 to higher number of revolutions suitable to drive the generator 4. The generator 4 and the gear 6 are arranged in the nacelle 8. Further, the wind turbine comprises a brake 54, usually also situated in the nacelle 8, to stop the wind turbine 2 by stopping the main shaft 62. The mentioned elements and components are conventional elements and components of a wind turbine 2 and will, therefore, not be illustrated in more detail hereinafter.

Furthermore, a normal operation of the wind turbine 2 is not in the focus of the claimed invention and will thus also not be described in detail hereinafter. Only those items, elements and devices that are relevant to the claimed invention will be elucidated in the following description. It should be mentioned, that the claimed invention is not restricted to wind turbines of this type but may be used with any type of wind turbine, in particular gearless wind turbines, for example.

Many components 4, 6 of the wind turbine 2, such as the generator 4 or the gear 6, for example, need to be lubricated with a liquid lubricant to reduce friction and therefore to increase the lifetime of the generator 4 or the gear 6.

The term liquid lubricant in the context of the application refers to any liquid lubricant medium which, for example, can be used for lubricating any parts of the wind turbine 2. A typical example of such a lubricant is oil. Optionally, the liquid medium could also be used for cooling purposes. As a further option, the liquid medium could also be a hydraulic liquid used for a mechanical adjustment of different items of the wind turbine 2, for example to adjust the rotation angle of the nacelle 8 relative to the tower or to adjust the pitch of the blades 58.

In the example shown in FIG. 1, a first lubricating device 10 is arranged in the nacelle 8 for lubrication of the gear 6. The lubricating device 10 is a closed-loop arrangement with an inlet opening and an outlet opening connected to the gear 6. The closed-loop arrangement comprises a circulating pump 46 and a sensor device 32. The circulation pump 46 drives the liquid lubricant to circulate in the closed-loop arrangement to provide lubrication of the gear 6. The sensor device 32 measures the amount, i.e. the quantity, and the degree of degeneration, i.e. the quality, of the liquid lubricant in the lubricating device 10.

The wind turbine 2 comprises an automatic liquid lubricant changing arrangement 14 for removing waste liquid lubricant from the lubricating device 10 and to supply fresh liquid lubricant to the lubricating device 10.

The automatic liquid lubricant changing arrangement 14 comprises a source 66 of fresh liquid lubricant. The term "source" is used generically in the context of this application and may be any point from which liquid lubricant is fed into the supply line 24.

In the embodiment according to FIG. 1 the source 66 is realised in form of a simple tank 16 for storing fresh liquid lubricant. The tank 16 is arranged in the base 18 of the tower 18 of the wind turbine 2. A first end of a supply line 24 for supplying fresh liquid lubricant is connected to an outlet opening of the tank 16.

The supply line 24 extends from the base 18 of the tower 20 into the nacelle 8 of the wind turbine 2. The second end of the supply line 24 is connected to an input opening of the lubricating device 10. Accordingly, the supply line 24 may be used to convey fresh liquid lubricant from the source 66 to the lubricating device 10.

Therefore, the supply line 24 comprises a valve 48. By opening/closing the valve 48 the supply line 24 can be utilised to start/stop conveying fresh liquid lubricant. Further, a pump 22 is provided to pump fresh liquid lubricant from the tank 16 via the supply line 24 to the lubricating device 10. The pump 22 is driven by an electrical motor (not shown). The pump 22 and the valve 48 are controlled by a control device 28, which is explained later in detail.

Further, the automatic liquid lubricant changing arrangement 14 comprises a waste liquid lubricant collecting unit 52 for waste liquid lubricant. In the embodiment according to FIG. 1 the waste liquid lubricant collecting unit 52 comprises a collecting tank 12 for storing waste liquid lubricant. The volume of the collecting tank 12 is large enough to store the amount or quantity of waste liquid lubricant circulating in the lubricating device 10. The collecting tank 12 is also arranged at the base 18 of the tower 18 of the wind turbine 2. An inlet opening of the collecting tank 12 is connected to a first end of a removal line 26 for removing waste liquid lubricant from the lubricating device 10.

The removal line 26 extends from the base 18 of the tower 20 to the nacelle 8 of the wind turbine 2, and the second end of the removal line 26 is connected to an outlet opening of the lubricating device 10. Accordingly, the supply line 26 is suitable to convey waste liquid lubricant from the lubricating device 10 to the waste liquid lubricant collecting unit 52. The removal line 26 comprises a valve 50, such that, by opening/closing the valve 50, the removal line 26 can be opened/close to start/stop conveying waste liquid lubricant. This valve 50 may also be controlled by the control device 28.

The supply line 24 and the removal line 26 comprise one or more flexible hoses (not shown), which are arranged, for example, similar to a cable loop of electric cables (not shown) running from the generator 4 in the nacelle 8 into the tower 20. In particular, a length of the sag of the flexible hoses is dimensioned in accordance to a length of the sag of the electric cables. One advantage of this arrangement is that the number of permitted twists of the flexible hoses of the supply line 24 and the removal line 26—when the nacelle rotates relative to the tower—is matched to the number of twists for which the electric cables are designed. A conventional twist sensor (not shown) detects a defined and permitted amount of rotations of the nacelle 8 and—when this number is reached—initiates a backwards rotation of the nacelle 8 in an opposite direction to an initial position. In this way, the electric cables and the flexible hoses of the supply line 24 and removal line 26 are untwisted synchronously.

The supply line 24 and the removal line 26 are pipes or tubes with a circular diameter, whereby the diameter of the supple line 24 is smaller than the diameter of the removal line 26. This reduces the dead-volume of the supply line 24 which has to be filled before the level of fresh liquid lubricant can reach the lubricating device 10.

Moreover, the tank 16 of the source 66 arranged below the lubricating device 10 has a greater volume for storing fresh liquid lubricant that the collecting tank 12 of the waste liquid lubricant collector 52. Therefore, in the collecting tank 12 an amount or quantity of the fresh liquid lubricant may be stored that is, at minimum, equal to the amount which is necessary to fill the dead volume of the supply line 24 and the lubricating device 10 to work properly.

As already mentioned above, the automatic liquid lubricant changing arrangement 14 comprises a control device 28. The control device 28 comprises a CPU 78 connected to an input interface 76 and an output interface 38.

The input interface 76 of the control device 32 may receive a start signal for starting the process of liquid lubricant exchange from a remote control 80. The remote control 80 could be in a helm stand 82 far away from the wind turbine 2. For example, the wind turbine 2 may be part of an offshore wind park, whereby the helm stand 82 is situated onshore.

The input interface 76 of the control device 28 is also connected to the sensor device 32. According to the values measured by the sensor device 32 the CPU 78 of the control device 28 may automatically start the process of liquid lubricant exchange. Alternatively, the control device 28 may generate and send a signal to the helm stand 82 to inform a technician at the helm stand 82 about the measured values.

The output interface 38 of the control device 28 is connected to the pumps 22, 46 for starting/stopping the pump 28 and the circulating pump 46. Further, the output interface 38 is connected to the valves 48, 50 to open/close the valves 48, 50.

To ensure that the process of liquid lubricant exchange is carried out in any case in certain time intervals, for example every five years, the control device 32 is equipped with a clock 30. This clock 30 may trigger the CPU 78 to start the process of liquid lubricant exchange.

To initiate a process of liquid lubricant exchange the control device 28 generates a control signal to stop the wind turbine 2, and sends the signal to the brake 54 to stop the rotation of the hub 56 of the wind turbine 2.

In a next step, the control device 28 generates and sends a control signal to stop the circulation pump 46.

In a further step, the control device 28 generates and sends a control signal to open the valve 50 in the removal line 26.

Caused by gravity, the waste fluid lubricant will flow through the removal line 26 to the collecting tank 12 at the base 18 of the tower 20 of the wind turbine 2.

After the lubricating device 10 is exhausted the control device 28 generates and sends a signal to close the valve 50 again. To control whether the waste liquid lubricant is exhausted the sensor device 32 for measuring the quantity of the waste liquid lubricant in the lubricating device 10 could be used, for example.

In a next step, the control device 28 generates and sends a control signal to open the valve 48 in the supply line 24. Further, the control device 32 generates and sends a control signal to activate the pump 22. Accordingly, the pump 22 conveys fresh liquid lubricant from the tank 16 through the supply line 24 into the lubricating device 10.

When the lubricating device 10 is filled up with fresh liquid lubricant, the control device 28 generates and sends a signal to pump 22 to stop. Fresh liquid lubricant in the supply line 24 will flow back to the tank 16 by gravity. After the supply line 24 is exhausted the control device 28 generates and sends a signal to close the valve 28.

Now the control device 28 generates and sends a signal to start the circulation pump 46 again, so that the fresh liquid lubricant will circulate in the closed-loop arrangement of the lubricating device 10.

Finally, the control device 24 generates and sends a signal to release the brake 54. Accordingly, the hub 56 may start rotating again.

Figure 2:
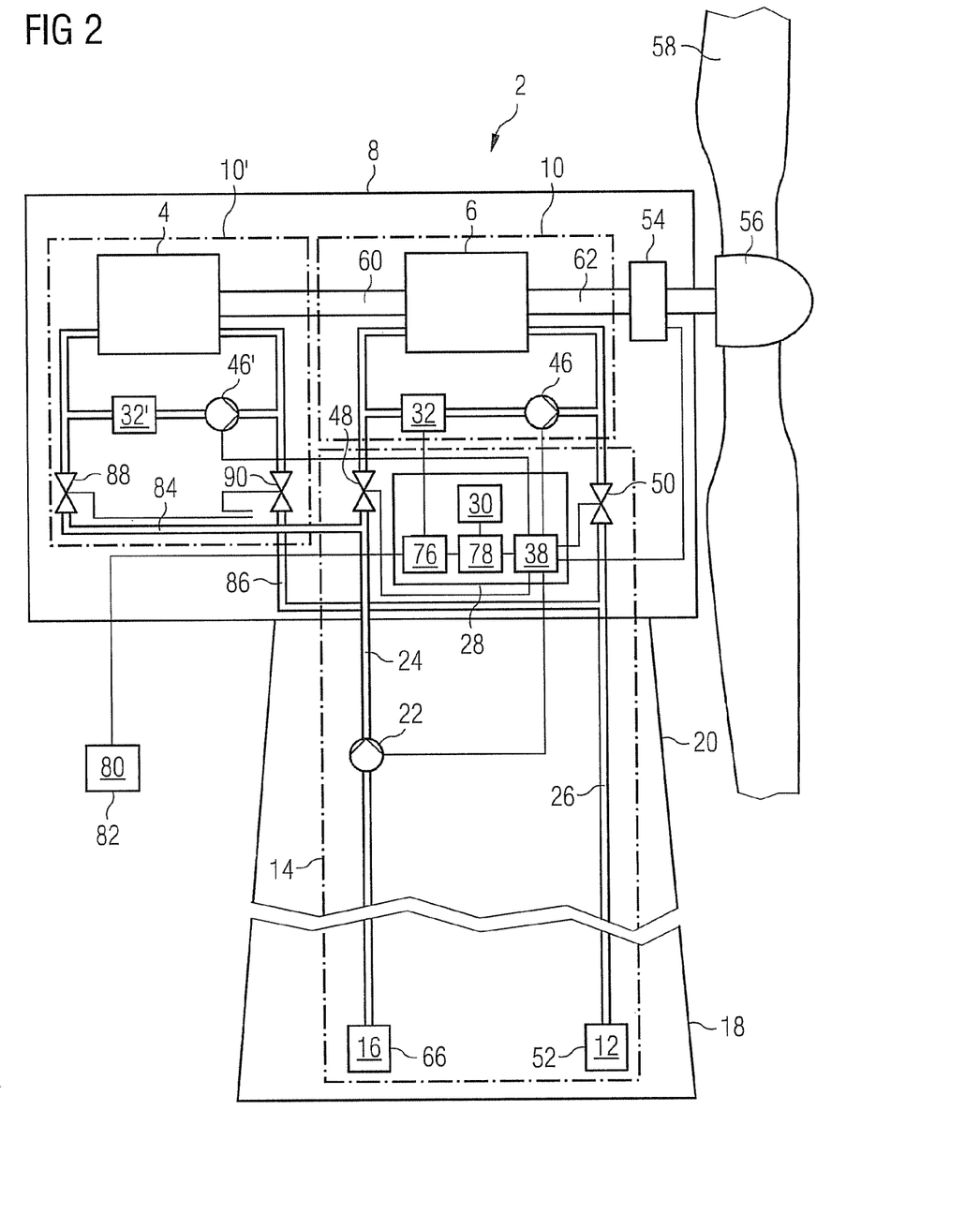
FIG. 2 shows a schematic representation of a second embodiment of a wind turbine.

FIG. 2 shows a second embodiment of a wind turbine 2. The wind turbine 2 of FIG. 2 comprises many same elements and components as the wind turbine of FIG. 1. In the following, only such elements or components which are different from the embodiment of FIG. 1 are explained in detail.

In FIG. 2 the automatic liquid lubricant changing arrangement 14 is both connected to the lubricating device 10 of the gear 6 and to a lubricating device 10' of the generator 4. The lubricating device 10' comprises a sensor device 32' to measure the amount, i.e. the quantity, and the degree of degeneration, i.e. the quality, of the liquid lubricant in the lubricating device 10' and a second circulation pump 46' to circulate liquid lubricant in the closed-loop arrangement of the lubricating device 10'.

Accordingly, the automatic liquid lubricant changing arrangement 14 is used for carrying out a process of liquid lubricant exchange of two components 4, 6. Therefore, both the supply line 24 and the remote line 26, comprise a branch supply line 84 and a branch removal line 86 connected to the lubricating device 10' of the generator 4. To open/close the branch supply line 84 and the branch removal line 86 valves 88, 90 are provided, which are connected to the output interface 38 of the control device 28. By receiving signals to start a process of liquid lubricant exchange within the lubricating device 10' of the generator 4 the input interface the CPU 78 of the control device 28 will carry out the process of liquid lubricant exchange in a similar manner as described above.

Figure 3:
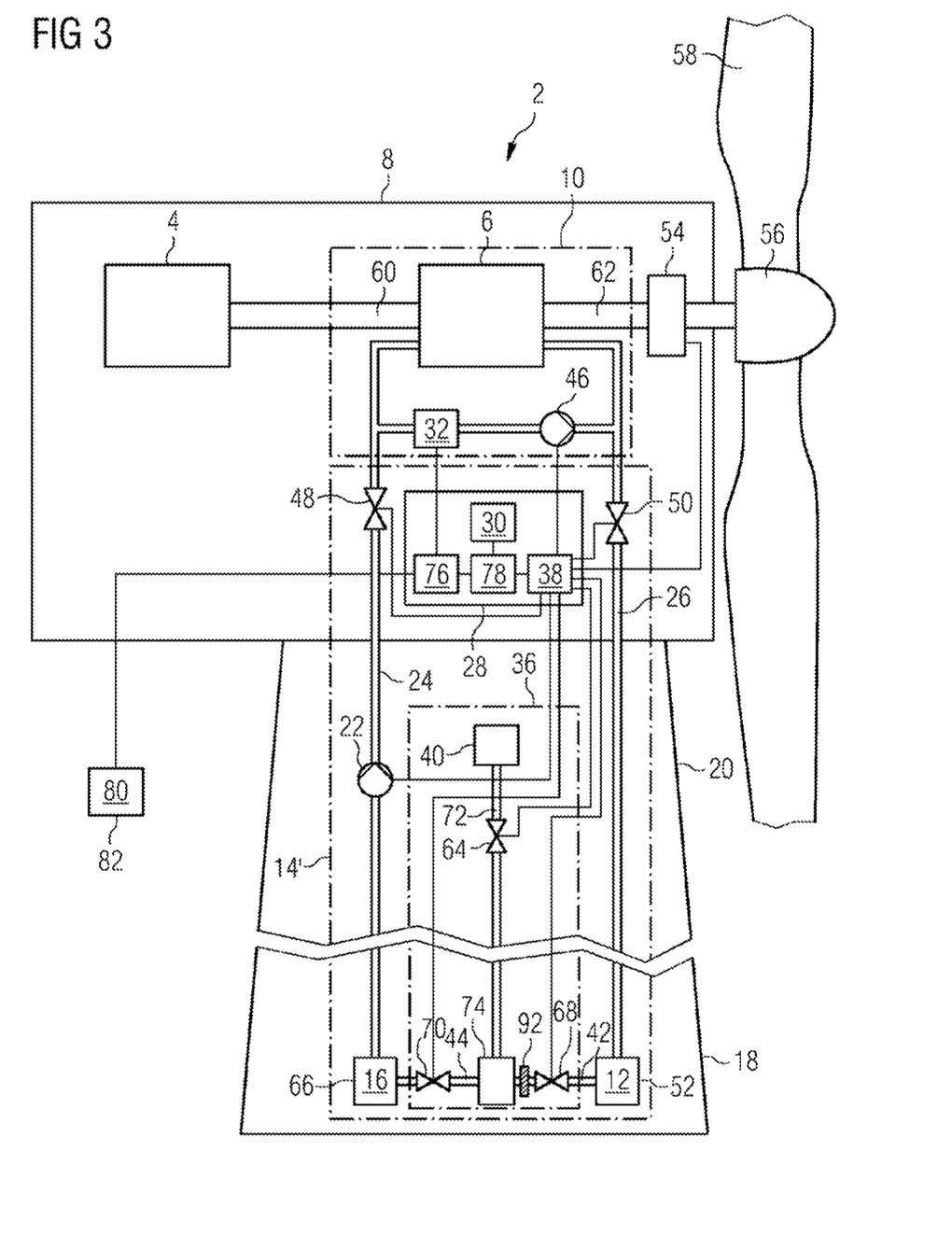
FIG. 3 shows a schematic representation of a third embodiment of a wind turbine.

FIG. 3 shows a third embodiment of a wind turbine 2. The wind turbine 2 according to FIG. 3 comprises many same elements and components as the wind turbine of FIG. 1. Only such elements which are different from the embodiment according to FIG. 1 are explained in detail.

In FIG. 3 the automatic liquid lubricant changing arrangement 14' comprises, additionally, a reconditioning device 36 for reconditioning waste liquid lubricant. This reconditioning device 36 is arranged in the base 20 of the tower 18 of the wind turbine 2.

The reconditioning device 36 comprises a mixing chamber 74 with an inlet opening connected to a first end of a first connecting line 42. The second end of the first connecting line 42 is connected to the outlet opening of the waste liquid lubricant collecting unit 52. Accordingly, waste liquid lubricant can be conveyed through the first connecting line 42 from the tank 12 of the waste liquid lubricant collecting unit 52 to the mixing chamber 74.

Further, the mixing chamber 74 comprises an outlet opening connected to a first end of a second connecting line 44. The second end of the second connecting line 44 is connected to the outlet opening of the tank 16. Accordingly, lubricant can be conveyed through the second connecting line 44 from the mixing chamber 74 to the tank 16.

The first connecting line 42 and the second connecting line 44 can be opened/closed by valves 68, 70, respectively.

Moreover, the reconditioning device 36 comprises a third tank 40 for an additive for reconditioning waste fluid lubricant. To mix the additive with waste fluid lubricant an outlet opening of the third tank 40 is connected to a first end of the third connecting line 72. The second end of the third connecting line 72 is connected to a second inlet opening of the mixing chamber 74. The reconditioning device 36 comprises a valve 64 to open/close the third connecting line 72 and to let additive from the third tank 40 flow by gravity to the mixing chamber 74. Before the mixing chamber 74 a filter 92 is provided in order to keep back dirt particles, caused by abrasion, for example.

The output interface 38 of the control device 28 is connected to the valve 64, 68, 70 to open/close the valves 64, 68, 70.

To reconditioning waste liquid lubricant the control device 28 generates and sends in a first step a signal to open the valve 68. Consequently, the mixing chamber 64 will be filled with waste fluid lubricant flowing from the waste collecting unit 52.

After closing the valve 68 in a second step the control device 28 generates and sends a signal to open the valve 64 to let additive flow in the mixing chamber 64. By mixing the waste liquid lubricant with the additive the waste liquid lubricant is regenerated to fresh liquid lubricant.

After closing the valve 64 in a third step the control device 28 generates and sends a signal to open the valve 70 to let the regenerated fresh liquid lubricant flow into the source 16.

In the source 16 the regenerated fresh liquid lubricant is mixed with fresh liquid lubricant stored in the source 16. Accordingly, in a fourth step fresh liquid lubricant is stored in the source 16 to be later filled into the lubricating device 10. If the waste liquid lubricant can not be regenerated anymore the waste liquid lubricant can be stored in the tank 12 for removal by a technician.

Alternatively, the reconditioning device 36 can be arranged in the nacelle 8 of the wind turbine 2. Hence, waste liquid lubricant for reconditioning need not flow through the removal line 26 to the base 18 of the tower 20 of the wind turbine 2 and afterwards to be pumped up to the lubricating device 10 through the supply line 24. Accordingly, less pumping energy is necessary. If the waste liquid lubricant has such a degree of degeneration that it cannot be reconditioned anymore the waste liquid lubricant will be conveyed through the removal line 26 to the collecting tank 12.

Although the present invention has been disclosed in the form of preferred embodiments and variations thereon, it will be understood that numerous additional modifications and variations could be made thereto without departing from the scope of the invention. For the sake of clarity, it is to be understood that the use of "a" or "an" throughout this application does not exclude a plurality, and "comprising" does not exclude other elements or steps. A "component" or "unit" can comprise a number of components unless otherwise stated.

The invention claimed is:

1. A wind turbine, comprising: an automatic liquid lubricant changing arrangement comprising a source of liquid lubricant, a supply line for supplying the liquid lubricant from the source to a component of the wind turbine, which requires lubricating, a waste liquid lubricant collecting unit for waste liquid lubricant, and a removal line for conveying the waste liquid lubricant from the component to the waste liquid lubricant collecting unit, wherein the automatic liquid lubricant changing arrangement further comprises a control device, wherein the control device controls the wind turbine such that is configured to determine that a procedure to remove waste liquid lubricant and/or to supply liquid lubricant is to be carried out, wherein responsive to this determination the control device is configured to cause: the wind turbine to be is stopped by activating a brake of the wind turbine, after the wind turbine has stopped, waste liquid lubricant to be is removed from the component by opening the removal line, liquid lubricant to be is supplied to the component by opening the supply line, and the wind turbine is-to be started by releasing the brake.

2. The wind turbine according to claim 1, wherein the component requiring the lubricating is arranged in a nacelle of the wind turbine.

3. The wind turbine according to claim 1, wherein the waste liquid lubricant collecting unit comprises a collecting tank for waste liquid lubricant.

4. The wind turbine according to claim 1, wherein the waste liquid lubricant collecting unit and/or the source are arranged at a base of a tower of the wind turbine.

5. The wind turbine according to claim 1, wherein the automatic liquid lubricant changing arrangement comprises a pump for conveying the liquid lubricant and/or waste liquid lubricant.

6. The wind turbine according to claim 1, wherein the source has a greater volume for storing liquid lubricant than the waste liquid lubricant collecting unit.

7. The wind turbine according to claim 1, wherein the removal line has a greater diameter than the supply line.

8. The wind turbine according to claim 1, wherein the automatic liquid lubricant changing arrangement comprises a reconditioning device that reconditions waste liquid lubricant.

9. The wind turbine according to claim 8, wherein the reconditioning device comprises a reservoir including an additive that is operable to recondition waste liquid lubricant.

10. The wind turbine according to claim 8, wherein the reconditioning device is arranged in a base of a tower of the wind turbine.

11. The wind turbine according to claim 1, wherein the control device comprises a clock for determining a point of time for removing waste liquid lubricant and supplying liquid lubricant.

12. The wind turbine according to claim 1, wherein the control device is connected to a sensor device for measuring a liquid lubricant quality and/or quantity for determining a point of time for removing waste liquid lubricant and/or supplying liquid lubricant.

13. The wind turbine according to claim 1, wherein the control device is connected to a remote control for starting a procedure for removing waste liquid lubricant and/or supplying liquid lubricant.

14. A control device for a wind turbine, comprising: an output interface; at least one processor, wherein the at least one processor is configured to determine that a procedure to remove waste liquid lubricant and/or to supply liquid lubricant is to be carried out, wherein responsive to this determination the at least one processor is configured: to cause the output interface to output a signal that causes a brake of the wind turbine to be activated in order to stop the wind turbine, wherein after the wind turbine is stopped, the at least one processor is configured to cause the output interface to output a signal that causes a removal line to open so as to remove at least a portion of waste liquid lubricant from a component of the wind turbine, wherein after removal of at least the portion of the waste liquid lubricant from the component, the at least one processor is configured to cause the output interface to output a signal that causes a supply line to open so as to supply a fresh liquid lubricant to the component, and wherein after the fresh liquid lubricant has been supplied to the component, the at least one processor is configured to cause the output interface to output a signal that causes the brake to be released in order to start the wind turbine.

15. A method of operating a wind turbine, comprising:
through operation of a control device of an automatic liquid lubricant changing arrangement, determining that a procedure to remove waste liquid lubricant and/or to supply liquid lubricant is to be carried out,
responsive to this determination, through operation of the control device:
stopping the wind turbine using a brake of the wind turbine,
after the wind turbine is stopped, removing waste liquid lubricant by opening a removal line for conveying waste liquid lubricant to a waste liquid lubricant collecting unit for waste liquid lubricant of the automatic liquid lubricant changing arrangement,
supplying fresh liquid lubricant by opening a supply line for supplying fresh liquid lubricant from a source of fresh liquid lubricant of the automatic liquid lubricant changing arrangement, and
starting the wind turbine by releasing a brake.

16. The method according to claim 15, wherein the waste liquid lubricant is removed from a component arranged in a nacelle of the wind turbine, and wherein the fresh liquid lubricant is supplied to the component.

* * * * *